Dec. 17, 1957     C. J. CUSTER     2,817,016
TRIANGULAR WAVE GENERATOR
Filed Feb. 14, 1955     2 Sheets-Sheet 1
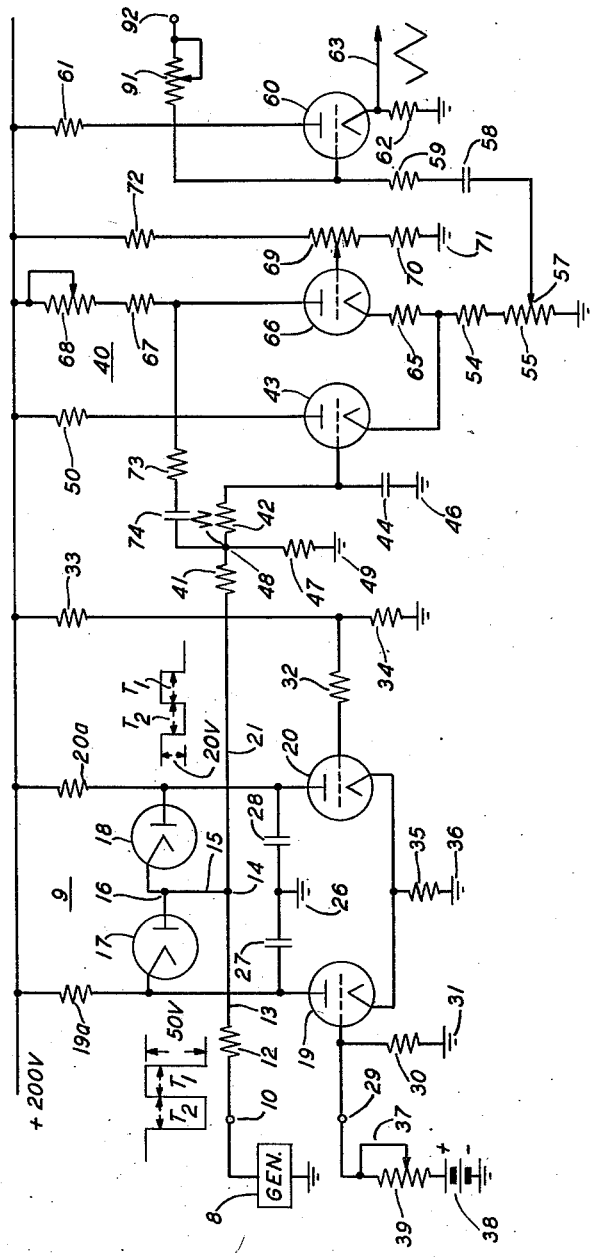
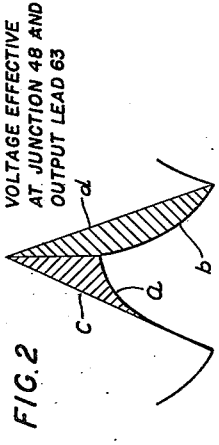
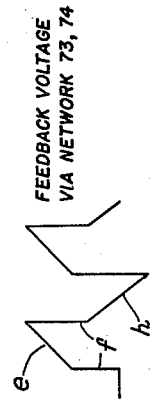
INVENTOR
C. J. CUSTER
BY Patrick J. Roche
ATTORNEY Dec. 17, 1957

C. J. CUSTER 2,817,016

TRIANGULAR WAVE GENERATOR

Filed Feb. 14, 1955

INVENTOR
C. J. CUSTER

BY Patrick J. Roche
ATTORNEY

United States Patent Office 2,817,016
Patented Dec. 17, 1957

2,817,016

TRIANGULAR WAVE GENERATOR

Charles J. Custer, Plainfield, N. J., assignor to Bell Telephone Laboratories, Incorporated, New York, N. Y., a corporation of New York Application February 14, 1955, Serial No. 488,062

13 Claims. (Cl. 250—27)

This invention relates to a generator of periodical voltages of triangular waveform whose amplitude is automatically controllable.

It is well known in prior systems to utilize the charge and discharge of a capacitor for translating a rectangular or sinusoidal voltage into a voltage of triangular waveform as disclosed in the patents of R. L. Carbrey and L. M. Meacham Nos. 2,602,151 and 2,669,656, issued July 1, 1952, and February 16, 1954, respectively. In the Carbrey system, a rectangular voltage controls an electronic switching circuit whereby the capacitor is initially charged with a constant current from a direct current source and is thereafter discharged with a constant current for producing a linear triangular voltage; and certain parameters of the switching circuit may be changed for independently varying the rates of the charge and discharge of the capacitor and thereby the amplitude of the generated voltage of triangular waveform. In the Meacham system, a sinusoidal voltage serves to trip one of two electronic tubes intercoupled in a slicer circuit in such manner that when one tube is conductive and the other non-conductive, a capacitor is charged from a direct current source and when the one tube is non-conductive and the other is conductive, the capacitor is discharged therethrough, and an inductor connected in the plate circuit of the other tube serves to charge and discharge the capacitor at a constant rate of current whereby a linear triangular voltage is developed thereacross.

The present invention contemplates a circuit for translating a rectangular voltage into a linear triangular voltage by adding a feedback voltage to the rectangular voltage for providing constant current during both the charge and discharge of a capacitor whereby a linearly varying triangular voltage is generated thereacross.

A feature of the invention involves an arrangement for clipping the amplitude of the rectangular voltage and thereby controlling the amplitude of the generated triangular voltage.

The present invention, in cooperation with a source of periodical rectangular voltage, comprises a triangular voltage generating circuit responsive to the rectangular voltage to charge a capacitor with a varying amount of current and thereby generating an exponential voltage thereacross and to discharge the capacitor with a varying amount of current and thereby generating an exponential voltage thereacross, an output for utilizing the voltage generated across the capacitor, and a feedback circuit connected to the capacitor for developing a feedback voltage which when added to the rectangular voltage effects a constant current during both the charging and discharging intervals of the capacitor whereby a linear voltage is generated across a capacitor. As the rectangular voltage is symmetrical in waveform the voltage generated across the capacitor has the form of an isosceles triangle.

A feature of the invention involves an amplitude clipper including two triodes whose grids are provided with bias of a predetermined magnitude, a common cathode resistor and a pair of electron diodes serially connected across the anodes of the triodes. This clips both ends of the rectangular voltage to the same extent thereby controlling the amplitude of the generated triangular voltage.

This invention will be readily understood from the following description when taken together with the accompanying drawing in which:

Fig. 1 is a schematic circuit illustrating a specific embodiment of the invention;

Figs. 2 and 3 are curves of voltages illustrating the operation of Fig. 1; and

Figure 4:
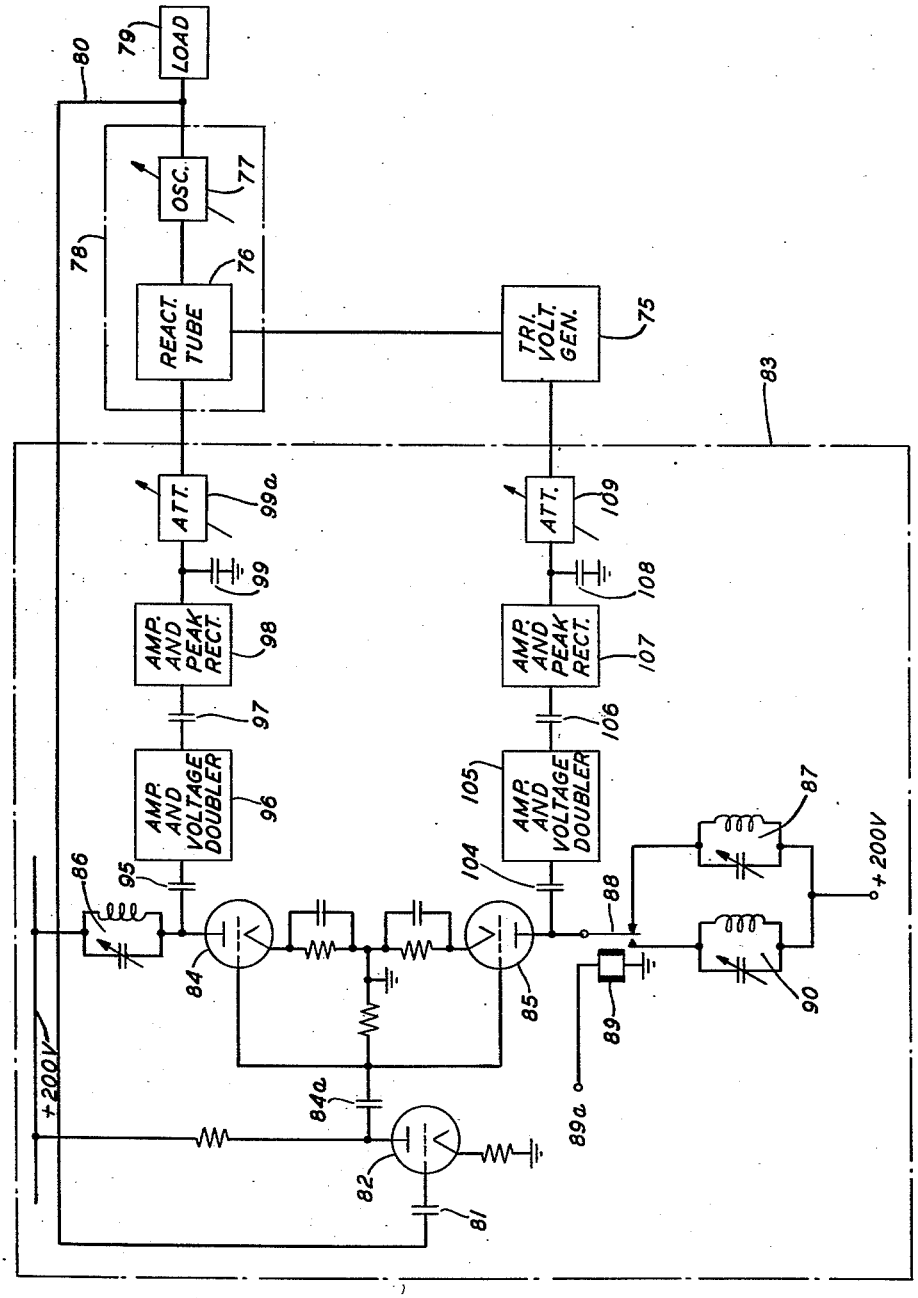
Fig. 4 is a schematic circuit showing an arrangement for producing voltages usable in Fig. 1.

Referring to Fig. 1 a rectangular voltage pulse clipper 9 comprises a source 8 of rectangular voltage having a 75-cps. repetitive rate, for example, and connected via input terminal 10, resistor 12 and lead 13 to junction 14 which is connected by lead 15 to midpoint 16 of series connected diodes 17 and 18. The cathode of diode 17 is connected to the plate of triode 19 while the plate of diode 18 is connected to anode of triode 20. The plate of diode 17 is connected via midpoint 16 to the cathode of diode 18. A +200-volt source is connected via load resistor 19a to the cathode of diode 17 and plate of triode 19 and via load resistor 20a to the plates of diode 18 and triode 20. Thus the diodes are connected in series across the plates of the triodes, the latter plates being tied to ground 26 by capacitors 27 and 28, respectively. These capacitors are large enough to hold the plates of the triodes at a constant positive voltage for the 75-second duration of the input rectangular wave. An output voltage is supplied via junction 14 and lead 21 for a purpose that will be later explained.

The magnitude of a biasing voltage applied to terminal 29 and thereby to the grid of triode 19 may be fixed or variable in order to control the amplitude of the output rectangular voltage effective via lead 21 in a manner which will be presently explained. Resistor 30 connected between ground 31 and a junction of input terminal 29 and the grid of triode 19 constitutes a grid leak. The grid of triode 20 is held at a fixed bias by a voltage effective across resistor 32 and derived from voltage divider 33 and 34 connected in series across a +200-volt source. The cathodes of the triodes are connected through a common resistor 35 to ground 36.

The output of pulse clipper 9 is supplied via output lead 21 and series resistors 41 and 42 to the grid of triode 43 which is included in a generator 40 of a linear triangular voltage in a manner which will now be described. A capacitor 44 has one side connected to a junction of resistor 42 and the grid of cathode follower 43, and its opposite side to ground 46. Resistor 47 has one terminal connected between a junction 48 of series resistors 41 and 42 and its opposite terminal connected to ground 49, the junction 48 also constituting a second terminal of resistor 42 for a purpose that will appear later.

The plate of cathode follower 43 is connected through resistor 50 to the +200-volt source. This cathode follower includes cathode load resistor 54 and potentiometer 55 in series and provides an output voltage applied via swinger 57 of the potentiometer through series capacitor 58 and resistor 59 to the grid of cathode follower 60. The latter has its plate connected through resistor 61 to the +200-volt source and includes a cathode follower resistor 62 from which the output is taken via lead 63. Cathode follower 60 is provided with proper grid biasing voltage via potentiometer 91 and terminal 92 is connected to a suitable voltage source, not shown.

The cathode of cathode follower 43 is also coupled through resistor 65 to the cathode of triode 66 whose plate is connected through resistor 67 and potentiometer 68 in series to the +200-volt source. The grid voltage of triode 66 is fixed by potentiometer 69 which is connected via resistor 70 to ground 71 and through resistor 72 to the +200-volt source. A feedback circuit comprising resistor 73 and capacitor 74 in series connects the plate of triode 66 to the junction 48 between series resistors 41 and 42.

The operation of rectangular voltage pulse clipper 9 and triangular voltage generator 40 is as follows: Assume, for this illustration, that a rectangular voltage having amplitude of the order of 50 volts is supplied via generator 8, input terminal 10 and resistor 12 to the midpoint of diodes 17 and 18 as indicated by the waveform at input terminal 10. Next, suppose a positive biasing voltage of a preselected increasing magnitude is supplied via terminal 29 to the grid of triode 19 from a variable voltage source 37 comprising battery 38 and potentiometer 39 and further mentioned later herein. It will now be recalled from the foregoing description that the bias on the grid of triode 20 is held at a fixed value. Assuming the positive biasing voltage on the grid of triode 19 to be increasing, then the plate current in triode 19 increases thereby lowering the plate voltage thereof by a predetermined amount. Such increased plate current flowing in the common cathode resistor 35 produces a direct current voltage feedback which raises the voltage on the cathodes of both triodes 19 and 20.

Since the grid voltage of triode 20 is fixed, the rising of its cathode voltage with respect to ground is equivalent to increasing its negative grid bias. This causes the plate current of triode 20 to decrease, thus allowing the voltage of the associated plate to increase in magnitude toward that of the +200-volt source. The magnitude of the voltage increase at the plate of triode 20 is equal substantially to the magnitude of the voltage decrease at the plate of triode 19. If, on the other hand, the positive biasing voltage applied to the triode 19 were decreasing, then the plate voltage of triode 19 would increase and the plate voltage of triode 20 would decrease in equal amounts. Obviously, a steady amount of positive bias voltage applied to the grid of triode 19 would tend to provide no change in the relative magnitudes of the voltages effective at the plates of the respective triodes 19 and 20. Thus, the direct current feedback current provided by common cathode resistor 35 and causing a change in the magnitude of the plate voltage of triode 19 serves to produce substantially equal but opposite change in the magnitude of the plate voltage of triode 20. This can be utilized to clip the top and bottom of the input rectangular voltage in a symmetrical manner which will be presently explained.

Normally, the circuit parameters are so preselected, in regard to the voltage of source 9, that triode 19 has a steady plate voltage which is slightly higher than the plate voltage of triode 20 and that the remainder of the circuit in Fig. 1 operates in the manner explained below. Whenever the amplitude of the rectangular voltage effective at junction 14 of diodes 17 and 18, i. e., at the cathode of diode 18, tends to fall below the magnitude of the plate voltage of triode 20, which latter voltage is the same in magnitude as that of the plate of diode 18, then diode 18 is caused to conduct. This introduces substantially a short circuit between junction 14 and the plate of triode 20. As long as triode 20 conducts, the magnitude of the voltage at junction 14 becomes and remains that of the voltage effective at the plate of triode 20. As previously mentioned, the voltage charge on capacitor 28 tends to stabilize the magnitude of the voltage effect on the plate of triode 20 for the duration of the 75-second input rectangular voltage. Similarly, when the amplitude of the input rectangular voltage effective at junction 14, that is at the anode of diode 17, tends to rise above the magnitude of the plate voltage effective on triode 19, which latter voltage is the same as that on the cathode of diode 17, then diode 17 is caused to conduct. This effectively short circuits junction 14 to the plate of triode 19. As above pointed out, the voltage charge on capacitor 27 tends to stabilize the magnitude of the voltage at the plate of triode 19 for the duration of the 75-second input rectangular voltage.

Thus, the amplitude of the input rectangular voltage effective at junction 14 for application to outgoing lead 21 is determined by the magnitude of the plate voltages of triodes 19 and 20, which in turn are caused to vary in equal amounts but in opposite sense under control of the positive biasing voltage supplied to the grid of triode 19. For the purpose of this illustration, the amplitude of the 50-volt input rectangular voltage was clipped to provide an output rectangular voltage of 20 volts as indicated by the waveform adjacent to lead 21, the clipping being 15 volts at each of the top and bottom portions of the initial input voltage.

Disregarding for the moment, the effect of the voltage derived from series R–C feedback network 73 and 74, the changing polarity of the rectangular voltage effective at lead 21 causes a charging current to flow from the rectangular voltage source 8 and terminal 10 and then through resistors 12 and 41, junction 48 and resistor 42 into capacitor 44, and a discharging current to flow from this capacitor through resistor 42, junction 48 and resistors 12 and 41, terminal 10 and back to source 8 as further mentioned hereinafter. During this time, the triode 43 functions as a cathode follower which means its cathode rises in potential to remain above that of its associated grid, thereby avoiding the passage of grid current which, if it were to occur, would be objectionable for the reason that such grid current would tend to charge capacitor 44 and thus impair the proper biasing of the grid of triode 43. As a consequence, the voltage developed across capacitor 44 appears across cathode load resistors 54 and 55 and eventually at output lead 63, as previously explained.

Due to the voltage shown by the curves adjacent terminal 10 and lead 21, a charging current will flow from generator 8 through terminal 10, resistor 12, leads 13 and 21, resistor 41, junction 48 and resistor 42 in series into capacitor 44 to ground 46 for a time interval T1, and that the voltage developed across the capacitor is proportional to the current flow; and that when a discharging current flows from capacitor 44 through resistor 42, junction 48, resistor 41, leads 21 and 13, resistor 12 and terminal 10 to generator 8, the voltage developed across capacitor 44 is also proportional to such current flow. As the current flow due to the charging and discharging of capacitor 44 is exponential, the voltage developed across the capacitor is also exponential. Thus, the resulting waveform of the voltages developed across capacitor 44 is essentially a scalene triangle, substantially as illustrated by curves $a$ and $b$ in Fig. 2 in which curve $a$ represents the voltage developed by the charging current flowing into capacitor 44 and curve $b$ the voltage effected by the current discharging from capacitor 44. This means that the current flow through junction 48 causes the voltage developed thereat to vary substantially in the exponential manner previously mentioned in regard to the charging and discharging of capacitor 44. Thus, the voltage developed at junction 48 and across capacitor 44 varies substantially in same exponential manner.

As the paths of the current flow due to the charging and discharging of capacitor 44 include resistor 42, the voltage across this capacitor changes at a rate which is proportional to such current flow. If the current flow through resistor 42 were constant for both the charging and discharging intervals of capacitor 44, then the voltage developed across the capacitor would vary linearly with time. In order to produce the constant flow of current through resistor 42 the voltage thereacross must be kept constant which in turn requires that the voltage at junction 48 changes at the same rate as the voltage across the capacitor. This is accomplished by adding to the rectangular voltage normally present at junction 48 a voltage of triangular waveform received from the R-C feedback network 73 and 74, in which resistor 73 provides the feedback voltage and capacitor 74 provides essential D.-C. blocking. This is brought about in a manner which will now be explained. It will be recalled from the foregoing explanation that the voltage developed across capacitor 44 appears across cathode load resistors 54 and 55 of cathode follower 43. This voltage is coupled via resistor 65 to the cathode of triode 66 which has a fixed grid bias determined by potentiometer 69. An increasing voltage at the cathode of triode 66 is equivalent effectively to a decreasing voltage supplied to the grid thereof. As a consequence, the current flowing in the plate of triode 66 and series anode resistors 67 and 68 decreases thereby enabling the magnitude of the plate voltage of triode 69 to rise in a linear manner toward the value of the +200-volt source. This linearly increasing voltage having a triangular waveform is coupled via the R-C network to junction 48 at which it is added to the rectangular voltage already present thereat, resulting in a composite waveform substantially as that illustrated in Fig. 3. In the latter figure, curve $e$ represents the waveform of the linearly increasing voltage fed back to junction 48.

On the other hand, a decreasing cathode voltage applied to triode 66 is equivalent effectively to an increasing voltage supplied to the grid thereof. This serves to increase in the flow of plate current whereby the plate voltage is caused to decrease in magnitude in a linear manner from that of the +200-volt source. This linearly decreasing voltage is coupled via the R-C feedback network to junction 48 for addition to the rectangular voltage present thereat; and has a triangular waveform shown by curve $h$ in Fig. 3.

The amplitude of the feedback triangular voltage may be adjusted by potentiometer 68 to such value as is necessary to maintain a constant flow of current through resistor 42 as shown by the areas between curves $a$ and $c$, and $b$ and $d$ in Fig. 2. In the latter figure curves $a$ and $c$ represent the charging voltage of capacitor 44 and the feedback voltage, respectively, while curves $b$ and $d$ represent essentially the discharging voltage of capacitor 44 and the feedback voltage, respectively. Thus, the composite voltage at junction 48 has the waveform substantially of an isosceles triangle as indicated in the voltage curve adjacent thereto whereby the current flow through junction 48 and resistor 42 for both the charging and discharging of capacitor 44 is caused to be substantially constant. This means that a constant current flows through resistor 42 whereby a constant voltage is developed thereacross during both the charging and discharging of capacitor 44. As a consequence, the voltage effective at junction 48 and the voltage across capacitor 44 are both caused to vary at the same time rate which is linear. This voltage is available at output lead 63 substantially with the waveform of an isosceles triangle as indicated in the voltage curve adjacent to the latter lead, principally because the rectangular voltage available at lead 21 is symmetrical in waveform. It will be obvious that an unsymmetrical rectangular voltage at lead 21 will cause the voltage at output 63 to assume the waveform of a scalene triangle. From the foregoing, it will be apparent that the amplitude of the triangular voltage effective at output lead 63 may be varied by changing the bias on the grid of tube 19 which in turn causes the rectangular voltage appearing at lead 21 for charging and discharging capacitor 44 to be reduced in amplitude thereby fixing the amplitude of the triangular voltage as above explained.

Let it be assumed that the triangular voltage appearing at output lead 63 in Fig. 1 is utilized to activate a reactance tube in a swept oscillator in the well-known manner over one of two preselected frequency ranges, say for example, (a) from 0.3 megacycle through 8.5 megacycles and back to 0.3 megacycle, or (b) from 3.5 megacycles through 8.5 megacycles and back to 3.5 megacycles. The reactance tube may be further controlled to maintain the frequency sweep precisely between either the 0.3 mc. or 3.5 mc. lower band end frequency and the 8.5 mc. upper or middle band end frequency in a manner which will now be explained in connection with Fig. 4.

Referring to Fig. 4, it will be understood that a triangular voltage generator 75 comprising essentially the circuitry of Fig. 1 is employed to activate reactance tube 76 to cause oscillator 77, both constituting a so-called swept oscillator 78, to sweep its output over one of the two frequency ranges above-identified. The swept oscillator output is supplied to load 79.

A portion of the swept output is also supplied via lead 80 and capacitor 81 to grid of amplifier 82 included in a band edge setter circuit 83. After amplification, this swept portion is supplied through capacitor 84a to the grids of parallel amplifiers 84 and 85. A parallel L-C network 86 included in the plate circuit of amplifier 84 is tuned approximately to a frequency of 8.5 megacycles. A parallel L-C network 87 tuned approximately to a frequency of 0.3 megacycle is included normally in the plate circuit of amplifier 85 by way of swinger 88 of electromagnetic relay 89 whose operation is controlled in a manner to be mentioned subsequently. A second parallel L-C network 90 tuned approximately to a frequency of 3.5 megacycles is connectable to swinger 88 and thereby in the plate circuit of amplifier 85 under control of the relay operation. In regard to the latter, it will be understood that a suitable control circuit, not shown, is so automatically adjustable as not to furnish an operating voltage pulse via terminal 89a to the winding of relay 89 thereby allowing tuned network 87 to remain in the plate circuit of amplifier 85, when the triangular voltage supplied by generator 75 causes the swept oscillator to provide an output video signal in the frequency range of 0.3 megacycle through 8.5 megacycles and back to 0.3 megacycle; and that the control circuit is also automatically adjustable to supply an appropriate operating voltage pulse to terminal 89a thereby causing the relay to operate to substitute tuned network 90 for tuned network 87 when the triangular voltage furnished by generator 75 causes the swept oscillator to provide an output video signal in the frequency range of 3.5 mc. to 8.5 mc. and back to 3.5 mc. As a consequence, the envelope of the signal effective at the plates of amplifiers 84 and 85 contains a pulse at the frequency to which the respective L-C networks are tuned.

The plate of amplifier 84 is connected through capacitor 95 to an amplifier and voltage doubler detector 96 whose output is connected via capacitor 97 to the input of an amplifier and peak voltage rectifier 98. This rectifier charges capacitor 99 to the peak voltage of the 8.5 megacycles pulse received from tuned amplifier 84. When the rectified 8.5 megacycles pulse terminates capacitor 99 tends to discharge through a well-known type of resistance circuit not shown but included in the amplifier and peak rectifier, the time constant of the capacitor discharge circuit being very long so that only a small part of its charge leaks off before the next succeeding 8.5 megacycles rectified pulse charges the capacitor. As a consequence, the voltage developed across capacitor 99 comprises an average D.-C. voltage whose magnitude is only slightly lower than the peak voltage of the rectified 8.5 megacycle pulse. The voltage across capacitor 99 is supplied via variable attenuator 99a in Fig. 4 to fix the operating bias on the grid of the reactance tube and thereby set the center frequency about which the output video signal swings. Any tendency for a change to occur in the 8.5 megacycle circuit frequency is automatically reflected as a corresponding change in the magnitude of the voltage charge on the capacitor. Any changes in the voltage across the capacitor continuously varies the operating bias on the grid of the reactance tube in such sense as to ensure the output video signal of the oscillator swings at the proper center frequency and thereby does not sweep beyond the 8.5 megacycle frequency in either of the two operating frequency bands above identified.

The plate of amplifier 85 is connected through capacitor 104 to amplifier and voltage doubler detector 105 which is connected through capacitor 106 to an amplifier and peak voltage rectifier for charging capacitor 108. This circuitry operates in manner identical with that above described in regard to the output circuit connected to amplifier 84, except the rectified voltage pulse for charging capacitor 108 is either at the 0.3 or 3.5 megacycle frequency depending on the operation of relay 89 to connect either tuned circuit 87 or 90 in the output of amplifier 85 as above explained. The charge on capacitor 108 is passed through variable attenuator 109 which is initially adjusted to fix the amount of initial operating bias applied via terminal 29 to the grid of triode 19 in Fig. 1, in this event it being understood that voltage source 37 has been disconnected from the latter terminal. Thus, the charge on capacitor 108 determines the amplitude of the triangular voltage effective on output lead 63 as above explained with reference to Fig. 1, and the amplitude of the triangular voltage applied by generator 75 to reactance tube 76 in Fig. 4 determines the frequency range of the video output signal supplied by oscillator 77, i. e., whether the lower end frequency of the operating band is fixed at 0.3 or 3.5 megacycles. Obviously, any tendency for a change in such frequency is instaneously reflected as a change in magnitude of the voltage charge on capacitor 108. Such changes are then reflected as a varying bias on the grid of tube 19 in Fig. 1 whereby the amplitude of the triangular voltage at output terminal 63 in Fig. 1 is automatically varied to maintain the proper frequency range for the video output signal provided by oscillator 77 and thereby hold the lower band edge at either the 0.3 or 3.5 megacycle frequency.

In view of the foregoing it is apparent that the band edge setter circuit provides continuous voltages for so activating the reactance tube of the swept oscillator that the operating frequency thereof is continuously maintained at a preselected frequency band, i. e., the upper and lower ends of the frequency band are continuously maintained at preselected respective frequencies.

What is claimed is:

1. A triangular waveform generator comprising a source of rectangular voltage, means for continuously controlling the amplitude of the rectangular voltage received from said source, said controlling means comprising a pair of triodes each including a cathode, a grid and an anode, a common resistor connecting the cathodes of said triodes to ground, means supplying a fixed bias to the grid of one of said triodes, means for applying a predetermined bias to the grid of the other of said triodes, the effective voltages on the anodes of said triodes being determined by the bias on the respective grids thereof, and a pair of electron diodes connected in series between the anodes of said triodes, and means for translating the voltage received from said controlling means into a linear triangular voltage having an amplitude determined by the controlled amplitude of the rectangular voltage, said source and translating means being connected to a midpoint of said series connection of said diodes, one of said diodes conducting to limit the voltage of said source to the anode voltage of said one triode when the amplitude of the rectangular voltage received from said source tends to fall below the magnitude of the anode voltage of said one triode, the other of said diodes conducting to limit the voltage of said source to the anode voltage of said other triode when the amplitude of the rectangular voltage received from said source tends to exceed the magnitude of the anode voltage of said other triode.

2. A triangular waveform generator comprising a source of rectangular voltage, means for continuously controlling the amplitude of the rectangular voltage received from said source, and means for translating the voltage received from said controlling means into a linear triangular voltage having an amplitude determined by the controlled amplitude of the rectangular voltage, said translating means comprising a cathode follower including a control grid and a cathode, a load resistor connecting said cathode to ground, a capacitor connected across said control grid and ground so that a voltage developed across said capacitor also appears across said cathode load resistor, a further resistor having one terminal connected to said controlling means and a second terminal connected to a junction point of said control grid and capacitor, said capacitor being charged and discharged via a varying amount of current flowing through said last-mentioned resistor under control of the voltage effective at said one further resistor terminal whereby exponential voltages are developed across said capacitor, and feedback means connected between said cathode and said one further resistor terminal for supplying a linearly varying voltage of changing polarity and controllable magnitude to said last-mentioned terminal for addition to the rectangular voltage received at said last-mentioned terminal from said controlling means, said rectangular and feedback voltages effective at said one further resistor terminal causing a constant current to flow through said further resistor during the charging and discharging of said capacitor whereby a linearly varying voltage is developed thereacross.

3. A triangular waveform generator comprising a source of rectangular voltage, means for continuously controlling the amplitude of the rectangular voltage received from said source, said controlling means comprising a pair of triodes each including a cathode, a grid and an anode, a common resistor connecting said cathodes to ground, means applying a fixed bias to the grid of one of said triodes and a controllable bias to the grid of the other of said triodes, and a pair of electron diodes serially connected between the anodes of said triodes, and means for translating the voltage received from said controlling means into a linear triangular voltage having an amplitude determined by the controlled amplitude of the rectangular voltage, said source and translating means being connected to a midpoint of the series connection of said diodes, said translating means comprising a cathode follower including a control grid and a cathode, a load resistor connecting said last-mentioned cathode to ground, a capacitor connected across said last-mentioned control grid and ground so that a voltage due to the charge and discharge of said capacitor also appears across said load resistor, a further resistor having one terminal connected to said midpoint of said diode connection and a second terminal connected to junction of said capacitor and said last-mentioned control grid, said capacitor being charged and discharged through said further resistor under control of the voltage effective at said one further resistor terminal in such manner that a varying amount of current flows through said further resistor to produce an exponential voltage across said further resistor, and feedback means connected between said last-mentioned cathode and said one further resistor terminal for superimposing a linearly varying voltage of opposite polarity and controllable magnitude on the rectangular voltage effective at said last-mentioned terminal, said rectangular and feedback voltages effective at said one further resistor terminal varying linearly to provide a constant amount of current flow through said further resistor and thereby a constant voltage across said last-mentioned resistor during the charge and discharge of said capacitor, said last-mentioned current and voltage producing across said capacitor and load resistor a voltage which tends to follow the linearly varying voltage effective at said one further resistor terminal.

4. A triangular waveform generator comprising a cathode follower including a cathode and a grid, a resistor connecting said cathode to ground, a capacitor connected across said grid and ground so that a voltage developed across said capacitor also appears across said cathode resistor, a further resistor having one terminal connected to a junction of said grid and capacitor, means for applying a rectangular voltage to a second terminal of said further resistor to provide a varying amount of current for charging and discharging said capacitor therethrough, and feedback means connected between said cathode and said second further resistor terminal and responsive to the voltage at said cathode for adding linearly varying voltage of changing polarity and controllable amplitude to said rectangular voltage effective at said second further resistor terminal, said last-mentioned feedback and rectangular voltages causing a constant amount of current to flow through said further resistor during the charge and discharge of said capacitor whereby a voltage of triangular waveform is developed thereacross and appears at said cathode resistor.

5. The generator according to claim 4 in which said feedback means comprises essentially a resistance.

6. The generator according to claim 4 in which said feedback means comprises essentially a resistance, and means connected in circuit with said cathode and feedback means for linearly increasing the amplitude of the voltage in said feedback means during the charging of said capacitor and for linearly decreasing the amplitude of the voltage in said feedback means during the discharging of said capacitor.

7. The generator according to claim 4 in which said feedback means includes an electron tube having a cathode, a grid and an anode, a third resistor connected between said last-mentioned cathode and a junction of said first-mentioned cathode and resistor, means for applying a fixed bias to said last-mentioned grid, and resistive means connecting said last-mentioned anode to said second further resistor terminal, said feedback means being so responsive to the voltage at said first-mentioned cathode as to develop the linearly varying voltage for addition to the rectangular voltage effective at said second resistor terminal.

8. The generator according to claim 4 in which said feedback means includes a tube having a cathode, a grid and an anode, means for applying a fixed bias to said last-mentioned grid, a third resistor connecting said last-mentioned cathode to a junction point of said first-mentioned cathode and resistor, a variable resistor connected in circuit with said last-mentioned anode, and a resistance-capacity network connecting said last-mentioned anode to said second further resistor terminal.

9. An electrical circuit comprising a pair of electron tubes, each including a cathode, a grid and an anode, resistors connected in circuit with the anodes of said tubes, means for applying a fixed bias to the control grid of one of said tubes, a load resistor for the cathode of the other of said tubes, a second resistor having one terminal connected to the cathode of said one tube and another terminal connected to a junction of the cathode of said other tube and said load resistor, a capacitor connected across the grid of said other tube and ground, a source of signals, a third resistor connecting said source to a junction of said capacitor and the grid of said other tube, and a feedback circuit connecting the anode of said one tube to said last-mentioned junction.

10. An electrical circuit comprising two electron tubes each including a cathode, a grid and an anode, resistors in circuit with said anodes, a resistor common to the cathodes of said tubes, means for biasing the grids of said tubes and thereby fixing the amounts of voltage effective at the associated anodes, capacitors connecting said anodes to a point of fixed potential, two diodes each comprising a cathode and anode, said diodes being connected in series between said first-mentioned anodes in such manner that one diode has its cathode connected to the anode of one tube while the other diode has its anode connected to the anode of the other tube, an input circuit for signals of opposite polarities, and a signal output circuit, both last-mentioned circuits being connected to the midpoint of the series connection of said diodes, said one diode conducting to limit the voltage of said input circuit to the anode voltage of said one tube when a voltage of one polarity in said input circuit tends to rise above said last-mentioned anode voltage, said other diode conducting to limit the voltage of said input circuit to the anode voltage of said other tube when a voltage of a different polarity in said input circuit tends to fall below said last-mentioned anode voltage, the voltage of said input circuit as so limited by said diodes being available via said midpoint to said output circuit.

11. The circuit according to claim 10 in which said biasing means applies a fixed amount of bias to the grid of said other tube and a variable amount of bias to the grid of said one tube whereby the anode voltages of both said tubes are adjusted substantially to the same amount but in an opposite sense.

12. The circuit according to claim 10 in which said common resistor and said fixed bias on the grid of said other tube cooperate in response to the different amounts of bias applied to the grid of said one tube to cause the plate voltages of said two tubes to vary equal amounts but in an opposite sense whereby the amplitude of the signal input voltage effective at said common point is symmetrically controlled in regard to the top and bottom of the last-mentioned amplitude.

13. In a voltage amplitude clipper circuit, a pair of electron tubes each including a cathode, a grid and an anode, means for applying different amounts of bias to the grid of one of said tubes, means for applying a fixed bias to the grid of the other of said tubes, load resistors for the anode circuits of said tubes, a resistance common to the cathodes of said tubes for regulating the amount of space current in said other tube in response to a predetermined change in the amount of space current in said one tube, a pair of electron diodes, each having a cathode and an anode, an anode of one diode being connected to the cathode of the other diode so as to connect both said diodes in series, the cathode of said one diode being connected to the anode of said one tube and the anode of said other diode being connected to the anode of said other tube, a signal input circuit and a signal output circuit connected to a midpoint of the series connection of said diodes, and capacitors connecting the anodes of said tubes to a point of fixed potential, said one diode conducting when the signal input voltage at said midpoint tends to exceed the anode voltage of said one tube to short circuit said midpoint to said last-mentioned anode and said other diode conducting when the signal input voltage of said midpoint tends to fall below the anode voltage of said other tube to short circuit said midpoint to said last-mentioned anode whereby the top and bottom of the amplitude of the signal input voltage supplied to said midpoint are clipped substantially to the same extent, said clipped voltage being effective via said midpoint to said output circuit.

References Cited in the file of this patent

UNITED STATES PATENTS

| | | |
|---|---|---|
| 2,508,879 | Zagor | May 23, 1950 |
| 2,621,292 | White | Dec. 9, 1952 |
| 2,647,209 | Krause | July 28, 1953 |
| 2,669,654 | Maggio | Feb. 16, 1954 |
| 2,703,382 | Cleary | Mar. 1, 1955 |